(12) United States Patent
Yoda et al.

(10) Patent No.: US 10,823,314 B2
(45) Date of Patent: Nov. 3, 2020

(54) POLYURETHANE TUBE

(71) Applicant: Junkosha Inc., Kasama-shi (JP)

(72) Inventors: Keiji Yoda, Kasama-shi (JP); Hiroji Oda, Kasama-shi (JP)

(73) Assignee: Junkosha Inc., Kasama-shi (JP)

( * ) Notice: Subject to any disclaimer, the term of this patent is extended or adjusted under 35 U.S.C. 154(b) by 0 days.

(21) Appl. No.: 15/779,637

(22) PCT Filed: Nov. 29, 2016

(86) PCT No.: PCT/JP2016/085288
§ 371 (c)(1),
(2) Date: May 29, 2018

(87) PCT Pub. No.: WO2017/094699
PCT Pub. Date: Jun. 8, 2017

(65) Prior Publication Data
US 2018/0356010 A1   Dec. 13, 2018

(30) Foreign Application Priority Data

Nov. 30, 2015 (JP) ................................. 2015-233952
Dec. 23, 2015 (JP) ................................. 2015-250785
Feb. 9, 2016 (JP) ................................. 2016-023041

(51) Int. Cl.
| | |
|---|---|
| *F16L 11/00* | (2006.01) |
| *F16L 11/04* | (2006.01) |
| *B29C 48/10* | (2019.01) |
| *B29C 48/30* | (2019.01) |
| *B29C 48/09* | (2019.01) |

(Continued)

(52) U.S. Cl.
CPC .............. *F16L 11/04* (2013.01); *B29C 48/09* (2019.02); *B29C 48/10* (2019.02); *B29C 48/30* (2019.02); *B29C 48/022* (2019.02); *B29C 48/32* (2019.02); *B29K 2075/00* (2013.01); *B29K 2995/0072* (2013.01); *B29K 2995/0077* (2013.01); *B29K 2995/0082* (2013.01); *B29L 2023/005* (2013.01)

(58) Field of Classification Search
CPC .................................. F16L 11/04; B29C 48/09
USPC .............. 138/137, 141, 39; 428/36.91, 36.92
See application file for complete search history.

(56) References Cited

U.S. PATENT DOCUMENTS 5,759,647 A * 6/1998 Kuroda ................. B29C 45/261
138/DIG. 7
5,964,412 A * 10/1999 Thomas ................. F16L 11/12
239/195

(Continued)

FOREIGN PATENT DOCUMENTS

| CN | 1208423 A | 2/1999 |
|---|---|---|
| CN | 101605825 A | 12/2009 |

(Continued)

*Primary Examiner* — James F Hook
(74) *Attorney, Agent, or Firm* — The Webb Law Firm

(57) ABSTRACT

Provided herein is a polyurethane tube having a small bending repulsive stress and superior inner-pressure creep characteristics in a flexible polyurethane tube. The present polyurethane tube has a bending repulsive stress of 0.035 $N/mm^2$ or less, wherein the polyurethane tube is formed so that the difference between the storage elastic modulus $E'_{30}$ at 30° C. and the storage elastic modulus $E'_{80}$ at 80° C. is 15% or less of $E'_{30}$.

2 Claims, 6 Drawing Sheets

(51) Int. Cl.
  *B29C 48/00*   (2019.01)
  *B29C 48/32*   (2019.01)
  *B29K 75/00*   (2006.01)
  *B29L 23/00*   (2006.01)

(56) References Cited

U.S. PATENT DOCUMENTS

| | | | | |
|---|---|---|---|---|
| 6,179,008 | B1* | 1/2001 | Kawazura | B32B 7/12 |
| | | | | 138/125 |
| 6,946,173 | B2* | 9/2005 | Lim | A61L 29/041 |
| | | | | 428/34.1 |
| 7,307,136 | B2 | 12/2007 | Bleys et al. | |
| 8,337,734 | B2* | 12/2012 | Nikitina | A61M 5/142 |
| | | | | 264/211.2 |
| 8,978,713 | B2* | 3/2015 | Pellegrini | F16L 57/06 |
| | | | | 138/140 |
| 2002/0002363 | A1* | 1/2002 | Urakawa | A61L 29/049 |
| | | | | 604/544 |
| 2002/0103325 | A1 | 8/2002 | Bleys et al. | |
| 2006/0099368 | A1* | 5/2006 | Park | B32B 1/08 |
| | | | | 428/36.91 |
| 2007/0087150 | A1* | 4/2007 | Powell | B32B 1/08 |
| | | | | 428/36.9 |
| 2008/0149211 | A1* | 6/2008 | Yamada | C08L 27/18 |
| | | | | 138/145 |
| 2008/0311329 | A1* | 12/2008 | Inaba | B32B 1/08 |
| | | | | 428/36.91 |
| 2009/0169790 | A1* | 7/2009 | Nadeau | B29C 48/335 |
| | | | | 428/36.91 |
| 2010/0104783 | A1* | 4/2010 | Kitajima | B29C 61/003 |
| | | | | 428/35.1 |
| 2010/0108172 | A1* | 5/2010 | Liu | B32B 1/08 |
| | | | | 138/137 |
| 2014/0014219 | A1* | 1/2014 | Takemura | B25J 9/0012 |
| | | | | 138/140 |
| 2016/0024343 | A1* | 1/2016 | Nakai | C08L 67/00 |
| | | | | 138/137 |
| 2016/0333152 | A1 | 11/2016 | Cook et al. | |
| 2016/0347026 | A1 | 12/2016 | Kugel et al. | |
| 2018/0289924 | A1* | 10/2018 | Levering | A61M 25/0017 |

FOREIGN PATENT DOCUMENTS

| | | |
|---|---|---|
| JP | 5261787 A | 10/1993 |
| JP | 10160059 A | 6/1998 |
| JP | 10274362 A | 10/1998 |
| JP | 11239613 A | 9/1999 |
| JP | 2000501756 A | 2/2000 |
| JP | 200656056 A | 3/2006 |
| JP | 2006316281 A | 11/2006 |
| WO | 9721750 A1 | 6/1997 |
| WO | 2015109141 A1 | 7/2015 |
| WO | 2015123526 A1 | 8/2015 |

\* cited by examiner

POLYURETHANE TUBE

CROSS-REFERENCE TO RELATED APPLICATIONS

This application is the United States national phase of International Application No. PCT/JP2016/085288 filed Nov. 29, 2016, and claims priority to Japanese Patent Application Nos. 2015-233952, 2015-250785, and 2016-023041, filed Nov. 30, 2015, Dec. 23, 2015, and Feb. 9, 2016, respectively, the disclosures of which are hereby incorporated in their entirety by reference.

TECHNICAL FIELD

The invention relates to a polyurethane tube which is flexible and has excellent creep resistance.

BACKGROUND ART

Polyurethane tubes are widely used for various applications such as pneumatic tubes due to having excellent flexibility, good workability, and excellent mechanical properties compared to tubes formed of other rubber materials. Further, the polyurethane tubes are often used for piping to a movable portion or piping in a narrow space, such as piping into a cableveyor which moves on a stage of a semiconductor manufacturing apparatus, especially due to the flexibility thereof. Polyurethane, which is a material for forming such a tube, generally includes a soft segment composed of a polyol component and a hard segment composed of a low molecular weight glycol and a diisocyanate component.

Here, since flexibility of polyurethane is greatly affected by the soft segment, in order to increase the flexibility, generally, the proportion of the soft segment in the molecule is increased, and the proportion of the hard segment is decreased. The mechanical strength of a polyurethane tube is greatly affected by the hard segment. Thus, in order to increase the mechanical strength, that is creep resistance, it is common to increase the proportion of the hard segment in the molecule. Therefore, it is difficult to enhance creep resistance while maintaining sufficient flexibility.

As a conventional example of a technique for producing a polyurethane tube with improved properties, Patent Document 1 discloses a method of preparing a thermoplastic polyurethane tube having a phase separation structure, by heating the thermoplastic polyurethane tube to a temperature T1 which is not higher than the flow initiation temperature Tm and not lower than the glass transition point Tg, subsequently lowering the temperature to a temperature T2 (where Tm>T1>T2>Tg) to heat the thermoplastic polyurethane tube at the temperature T2, and then cooling the same, which employs a plurality of infrared heaters installed in the circumferential direction of the polyurethane tube to heat the polyurethane tube.

PRIOR ART DOCUMENT

Patent Document (Patent Document 1) Japanese Patent Application Laid-Open No. 2006-56056

However, in the conventional example described in Patent Document 1, it may be possible to uniformly control the structure throughout the entire tube and result in improved heat resistance, but it may be insufficient for improving creep resistance while maintaining sufficient flexibility. Generally, the phenomenon that a material under the influence of persistent stress over an extended period undergoes a gradual deformation with time is called a creep phenomenon. In the case of a tube, when the internal pressure is continuously applied for a long time, the phenomenon that the diameter of the tube is increased is first observed, followed by fracturing of the tube. Therefore, this creep phenomenon is an important problem in tubes used for piping and the like, and the improvement in creep resistance is indispensable. As described above, conventionally when the flexibility of a polyurethane tube is to be obtained, creep resistance is rather deteriorated. That is, there has been no feasible idea on how to realize a polyurethane tube having a small bending repulsive stress and excellent inner-pressure creep resistant characteristics.

SUMMARY OF THE INVENTION

The present invention has been made in view of the above problems, and an object of the present invention is to provide a flexible polyurethane tube having a small bending repulsive stress that exhibits excellent inner-pressure creep resistant characteristics while maintaining sufficient flexibility.

The inventors of the present invention have conducted intensive studies on the constitution necessary for achieving improvement in creep resistance as well as sufficient flexibility in a polyurethane tube, and as a result, found that a polyurethane tube configured to have a bending repulsive stress of 0.035 N/mm$^2$ or less at a bending radius of 100 mm, in which a difference between a storage elastic modulus $E'_{30}$ at 30° C. and a storage elastic modulus $E'_{80}$ at 80° C. is 15% or less of $E'_{30}$, can be realized as a polyurethane tube having a small bending repulsive stress and excellent inner-pressure creep resistant characteristics.

That is, in order to achieve the object, the polyurethane tube of the present invention has a bending repulsive stress of 0.035 N/mm$^2$ or less, in which a difference between a storage elastic modulus $E'_{30}$ at 30° C. and a storage elastic modulus $E'_{80}$ at 80° C. is 15% or less of $E'_{30}$. In the present application, that the bending repulsive stress is 0.035 N/mm$^2$ or less means that the value obtained by dividing the repulsive stress (in N) in the tube, which is measured by the method of measuring the bending repulsive stress to be described below, by the cross-sectional area (in mm$^2$) of the tube is 0.035 or less. Further, the "difference in storage elastic modulus" represents the absolute value of the difference between the storage elastic modulus $E'_{30}$ at 30° C. and the storage elastic modulus $E'_{80}$ at 80° C., which are measured based on the method of measuring the storage elastic modulus to be described below is, and is 15% or less of the storage elastic modulus $E'_{30}$ at 30° C. in the present invention. Since the creep phenomenon is likely to occur at high temperatures and the maximum use temperature of general urethane is around 80° C., the storage elastic modulus at 30° C. to 80° C., which is the use condition under which creep is likely to occur, is considered.

First, the polyurethane tube of the present invention has a bending repulsive stress of 0.035 N/mm$^2$ or less. The flexibility of a molded article of a urethane resin mainly depends on the soft segment portion being easy to move. When a urethane resin has a soft segment having a long molecular chain and a movable structure is provided, it is easily deformed (flexible). The urethane resin which is easily deformed normally forms a molded article which has a large elongation and a small tensile stress and is susceptible to bending deformation. Generally, when flexibility is given priority, the proportion of the soft segment in the molecule is increased, and the proportion of the hard segment is decreased. This produces an opposite effect to improving creep resistance, and it is difficult to achieve improvement of both flexibility and creep resistance.

Further, although hardness is a property close to the bending repulsive stress, having a low hardness does not always coincide with having a small bending repulsive stress.

Next, the difference between the storage elastic modulus $E'_{30}$ at 30° C. and the storage elastic modulus $E'_{80}$ at 80° C. is 15% or less of $E'_{30}$. Generally, the tube has molecular orientation in an extrusion direction (Machine Direction) as a result of extrusion molding. Such tubes tend to be easily deformed in the direction of molecules being aligned. The deformation (i.e., creep) of the tube may be curbed by eliminating the molecular orientation caused by molding of the tube. Alternatively, annealing may be performed so that molecules (hard segments) can be rearranged such that the molecular structure becomes more stabilized while still being oriented as extruded and crosslinking of molecules is promoted. The crosslinking of molecules may be confirmed by an increase in MFR. By forming the network structure by crosslinking of the molecules, the resistance to the deformation, i.e., elastic modulus, of the hard segment may be easily maintained. The difference between the storage elastic modulus $E'_{30}$ at 30° C. and the storage elastic modulus $E'_{80}$ at 80° C. is reduced by the above-described effects.

In addition to the above-described configuration of the present invention, a surface roughness may be 0.8 μm or more. When the surface roughness is configured to be 0.8 μm or more, the frictional coefficient of the surface is reduced (sliding property is improved). Further, since the polyurethane tube of the present invention is flexible and deforms upon compression, the stress applied to the tube is reduced, and thereby the amount of abrasion is reduced. Since the tube is flexible and not easily abraded, it is suitable for piping in a narrow space or, for example, piping to a movable portion such as a cableveyor. That is, even when it is used to provide piping, for example, to a movable portion such as a cableveyor, generation of powder due to abrasion against the inner wall of the cableveyor or any other cables in the cableveyor that may be contacted is curbed, and thus the lifetime of the tube is prolonged, and it is possible to reduce the trouble of replacing the tube and the like.

Further, polyurethane, which is a material for forming the tube of the present invention, includes a soft segment composed of a polyol component and a hard segment composed of a low molecular weight glycol and a diisocyanate component. Generally, urethane is classified into an ether type and an ester type according to the composition thereof, but the ether type thermoplastic polyurethane having excellent water resistance is used in the tube of the present invention.

According to the present invention, it is possible to provide a flexible polyurethane tube having a small bending repulsive stress that exhibits excellent inner-pressure creep resistant characteristics.

DESCRIPTION OF DRAWINGS

FIG. 1 is a view for explaining an extrusion molding method of a polyurethane tube according to an embodiment of the present invention, in which FIG. 1(A) is, as a comparative example, an image/drawing of the ratio (draw down ratio) of an outer diameter of a mold to an outer diameter of a tube when a urethane tube is molded in a conventional way, and FIG. 1(B) is an image/drawing of the ratio (draw down ratio) of the outer diameter of the mold to the outer diameter of the tube when a urethane tube is molded according to an embodiment of the present invention. When a tube is molded according to the embodiment of the present invention, extrusion molding is carried out such that the draw down ratio is close to 1.

DESCRIPTION OF THE INVENTION

The embodiments described below do not limit the invention according to the claims, and all of the combinations of the characteristics described in the embodiments are not necessarily essential for the formation of the present invention.

In an embodiment of the present invention, a polyurethane tube is configured to have a bending repulsive stress of 0.035 N/mm² or less, in which the polyurethane tube is formed so that a difference between a storage elastic modulus $E'_{30}$ at 30° C. and a storage elastic modulus $E'_{80}$ at 80° C. is 15% or less of $E'_{30}$, and thereby a polyurethane tube having a small bending repulsive stress and excellent inner-pressure creep resistant characteristics is realized.

Generally, polyurethane, which is a material for forming the tube of the embodiment of the present invention, includes a soft segment composed of a polyol component and a hard segment composed of a low molecular weight glycol and a diisocyanate component. As the polyol used in the tube of the embodiment of the present invention, an ether-based polyol such as polytetramethylene ether glycol (PTMG) is used, and as the diisocyanate, an aromatic diisocyanate such as 4,4-diphenylmethane diisocyanate is used.

Figure 1:
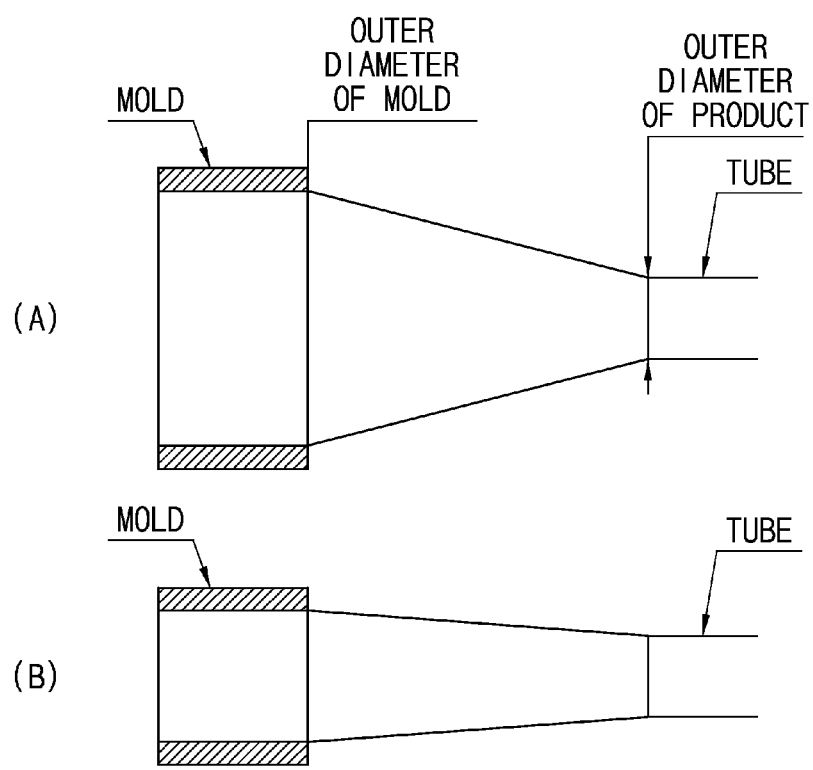

The gist of the method of preparing the polyurethane tube of the present embodiment will be described. Regarding the polyurethane tube of the present embodiment, two studies have been made on the preparation method aimed to reduce the deterioration of the above-described storage elastic modulus. In explaining the first study, the tube is generally oriented in the extrusion direction (Machine Direction) as a result of extrusion molding and tends to be deformed in the direction of molecules being aligned. Therefore, by eliminating the molecular orientation caused by molding of the tube, deformation (i.e., creep) of the tube may be curbed. In explaining the second study, additional annealing may be performed so that the molecules (hard segment) can be rearranged such that the molecular structure becomes more stabilized while still being oriented as extruded and crosslinking of molecules is promoted. Crosslinking of molecules may be confirmed by an increase in MFR. Here, by forming the network structure by crosslinking of the molecules, the resistance to the deformation, i.e., elastic modulus, of the hard segment may be easily maintained. By the effects of these two studies, the difference between the storage elastic modulus $E'_{30}$ at 30° C. and the storage elastic modulus $E'_{80}$ at 80° C. is reduced. FIG. 1(A) shows an image/drawing of the ratio (draw down ratio) of an outer diameter of a mold to an outer diameter of a tube when a urethane tube is molded in a conventional way. FIG. 1(B) is an image/drawing of the ratio (draw down ratio) of the outer diameter of the mold to the outer diameter of the tube when a urethane tube is molded according to an embodiment of the present invention. When a tube is molded according to the embodiment of the present invention, extrusion molding is carried out such that the draw down ratio is close to 1. As apparent from the comparison between FIGS. 1(A) and 1(B), the outer diameter of the mold for molding a urethane tube of the embodiment of the present invention is smaller than the outer diameter of the conventional mold for molding a urethane tube, and the ratio (draw down ratio) of the outer diameter of the tube is close to 1 in the embodiment of the present invention. As a result, in the tube of the embodiment of the present invention, the speed at which the tube is drawn down is reduced (slowed down) as much as possible, but the molecular orientation caused by molding of the tube may be curbed. In addition, by further annealing, the molecules (hard segments) can be rearranged such that the molecular structure becomes more stabilized while still being oriented as extruded, and a network structure is formed by crosslinking of molecules, whereby the resistance to the deformation, i.e., elastic modulus, of the hard segment may be easily maintained. Therefore, the difference between the storage elastic modulus $E'_{30}$ at 30° C. and the storage elastic modulus $E'_{80}$ at 80° C. may be reduced. Accordingly, the deformation (i.e., creep) of the tube may be curbed.

In order to support the above findings, the tube that had been annealed was pulverized and the crosslinking due to annealing was confirmed by a decrease in the MFR value. The results are shown in Table 1.

TABLE 1

|  | MFR g/10 min |
|---|---|
| The product of the present invention (Annealed tube) | 4.6 |
| Non-annealed tube | 6.3 |

In the product of the present invention, the MFR value, which is an index of the flowability of the molten resin, is 4.6 g/10 min, which is reduced from the MFR value, 6.3 g/10 min, of the conventional product. This is regarded to be due to the increase in the degree of crosslinking, and it is interpreted that the increase in the degree of crosslinking curbs molecular alignment in the extrusion direction (Machine Direction), and the additional annealing causes the molecules (hard segment) to be rearranged such that the molecular structure becomes more stabilized and form a network structure by crosslinking.

EXAMPLES

Evaluation of Bending Repulsive Stress and Creep Resistance

As the product of the present invention, two samples, Examples 1 and 2, were prepared. Further, as Comparative Example 1, a flexible tube which was formed of the same material as the examples of the present invention and prepared using the conventional preparation method (no annealing), which is a conventional preparation method (extrusion molding method) of FIG. 1 (A) (DDR=9 in this case), was used, and as Comparative Example 2, a conventional product tube formed of a conventional material different from that of the examples of the present invention was prepared in the same manner as in Comparative Example 1.

Molding of Polyurethane Tube

The polyurethane tubes of the present invention, Examples 1 and 2, were prepared by the following method.

As the thermoplastic polyurethane resin, Rezamin PH-2289 available from Dainichiseika Color & Chemicals Mfg. Co., Ltd. dried at a temperature of 90° C. or higher for 2 hours or more prior to molding was used. The dried polyurethane resin was introduced into a single-screw extruder having a cylinder diameter of 50 mm to perform molding of a tube. The tube was molded at a screw rotation speed of 10 rpm, a die temperature of 210° C., a draw down ratio of DDR=2 (DDR=3 in Example 2) and a draw speed of 5 m/min. Thus, a tube having an inner diameter of 5 mm and an outer diameter of 8 mm was obtained.

The prepared tube was aged at 80° C. for 24 hours, and then used as a sample tube for evaluation.

Evaluation of Tube

The results of the tube evaluation are shown in Table 2.

TABLE 2

|  | Example 1 | Example 2 | Comparative Example 1 | Comparative Example 2 |
|---|---|---|---|---|
| Size of tube | 8 × 5 | 6 × 4 | 8 × 5 | 8 × 5 |
| Creep test condition 1 | 26520 | 24940 | 6300 | 1270 |
| Creep test condition 2 | 1600 | 1380 | 387 | 76 |
| Bending repulsive stress 100 mm (N/mm$^2$) | 0.019 | 0.009 | 0.024 | 0.022 |
| Difference in storage elastic modulus ($E'_{30} - E'_{80}$)/$E'_{30}$ × 100 | 5% | 13% | 22% | 51% |

<Bending Repulsive Stress>

Figure 2:
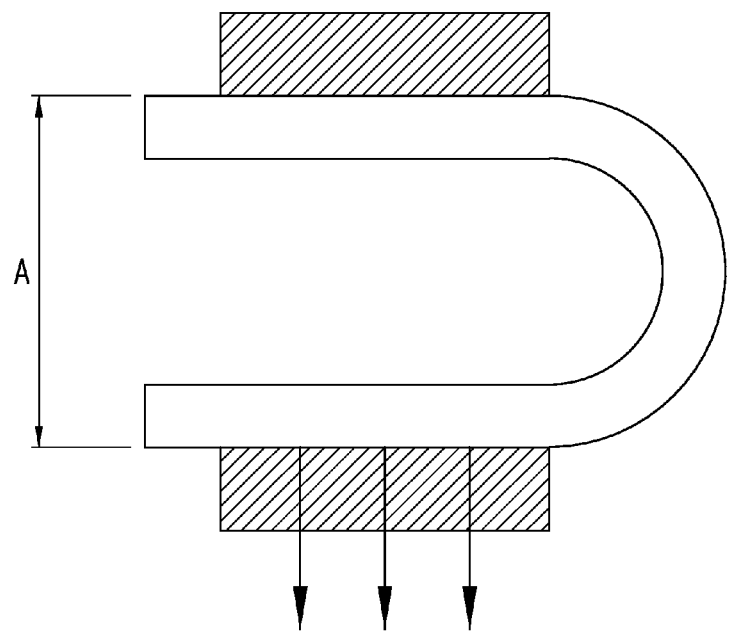
FIG. 2 is a view for explaining a method of measuring a bending repulsive stress.

FIG. 2 is a view for explaining a method of measuring the bending repulsive stress.

As shown in FIG. 2, a sample tube was set in a U-shape in a compression tester, and the repulsive stress generated by bending when the gap 2R between two ends of the U was 100 mm was measured.

Since the bending repulsive stress of the tube differs depending on the size of the 2R and the tube diameter, in the present application, the force per tube cross-sectional area was calculated from the repulsive stress generated by the bending measured when the 2R was 100 mm to obtain the bending repulsive stress (100 mm).

The bending repulsive stress (100 mm) of the tube of Example 1 of the present invention was 0.019 N/mm$^2$, and the bending repulsive stress (100 mm) of the tube of Example 2 was 0.009 N/mm$^2$. The bending repulsive stress (100 mm) of the flexible product prepared using the conventional preparation method of Comparative Example 1 was 0.024 N/mm$^2$ and the bending repulsive stress (100 mm) of the conventional product tube of Comparative Example 2 was 0.022 N/mm$^2$.

Figure 3:
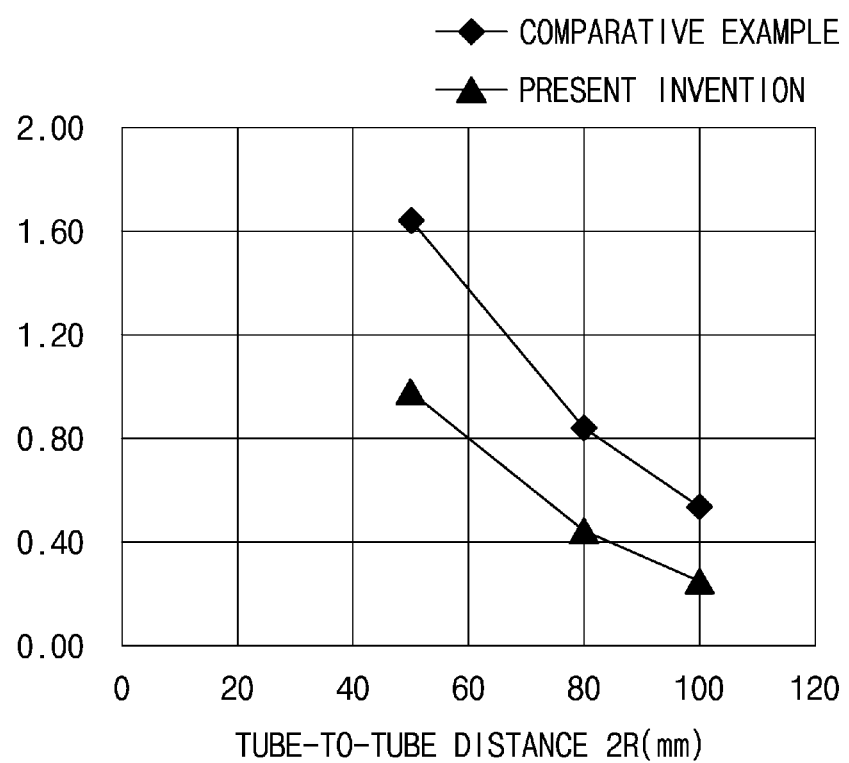
FIG. 3 is a graph showing the relationship between the tube-to-tube distance and the repulsive stress in a polyurethane tube according to an embodiment of the present invention.

FIG. 3 is a graph showing the relationship between the tube-to-tube distance and the repulsive stress in a polyurethane tube according to the embodiment of the present invention.

<Creep Lifetime Prediction Test>

As described above, as a creep phenomenon in the case of a tube, when the internal pressure is continuously applied for a long time, a swelling phenomenon is first observed, and then the tube is fractured. The creep phenomenon becomes an important problem in tubes used for piping and the like. There is a Larson-Miller method as a short-term experimental method for substituting the long-term creep failure test. In the Larson-Miller method, the relation of load stress, temperature, and lifetime is expressed by Equation (1).

[Equation 1]

$$T(\log t + A) = B\sigma \quad (1)$$

Here, T: absolute temperature, δ: load stress, and t: creep lifetime, and A and B are integers.

That is, according to the Larsen-Miller method, it is shown that a low load stress and a lifetime at low temperature can be predicted from the test results under accelerating conditions such as a high load stress or high temperature.

<Creep Test Method>

Joints were mounted onto both ends of the tube, compressed air of a predetermined pressure was sealed in the tube, and the time until the tube reached fracture was measured.

[Test Conditions]

Condition 1: Temperature is 40° C., and tube inner pressure is 10 kPa

Condition 2: Temperature is 55° C., and tube inner pressure is 9 kPa

The results of the creep test are shown in Table 2. It is shown that, the longer the time until the tube reaches fracture, the better the creep resistance and the longer the lifetime of the tube.

<Measurement of Storage Elastic Modulus>

The storage elastic modulus was measured by dynamic viscoelasticity measurement (DMA) using a thermomechanical analyzer TMA4000S manufactured by Bruker AXS.

The sample tube was melt-pressed by a hot press and cooled to prepare a sheet of the measurement sample. The prepared sheet was cut into a measurement size of 20 mm×5 mm×20 mm and used for measurement.

[Measurement Conditions]

Figure 4:
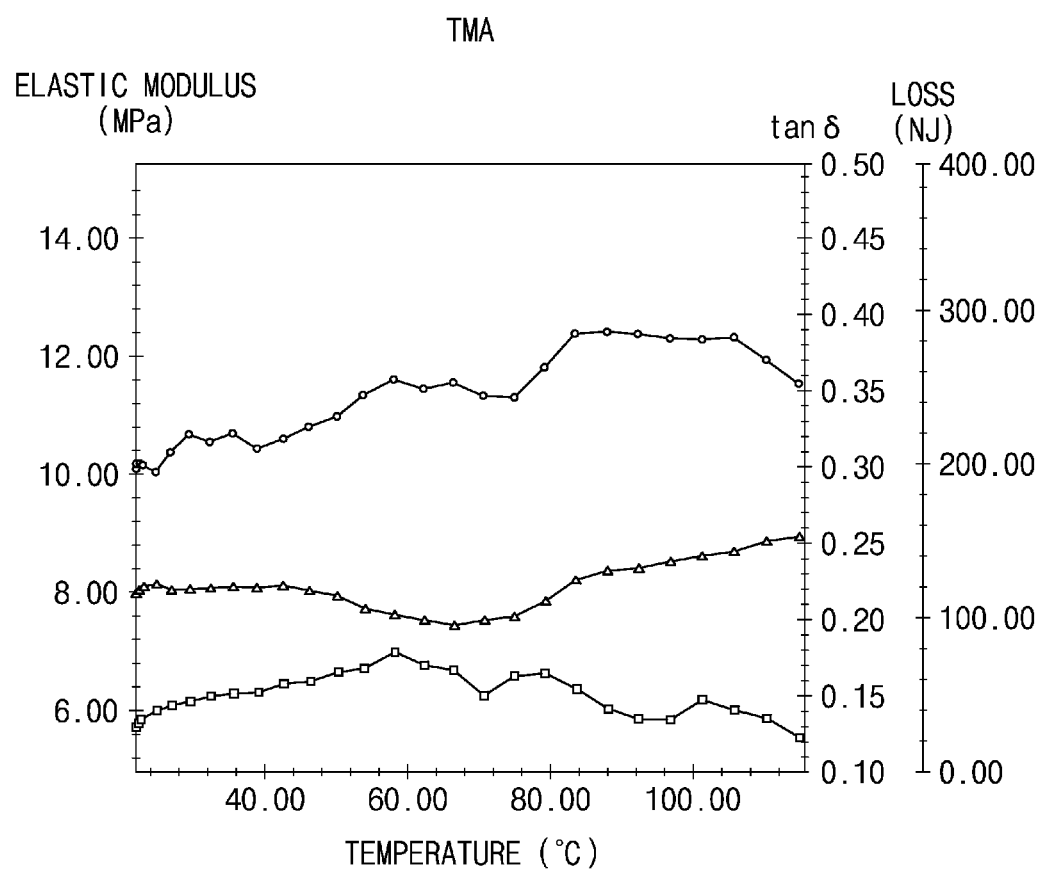
FIG. 4 is a graph of a result of dynamic viscoelasticity measurement (DMA) of a polyurethane tube according to an embodiment of the present invention.
Figure 5:
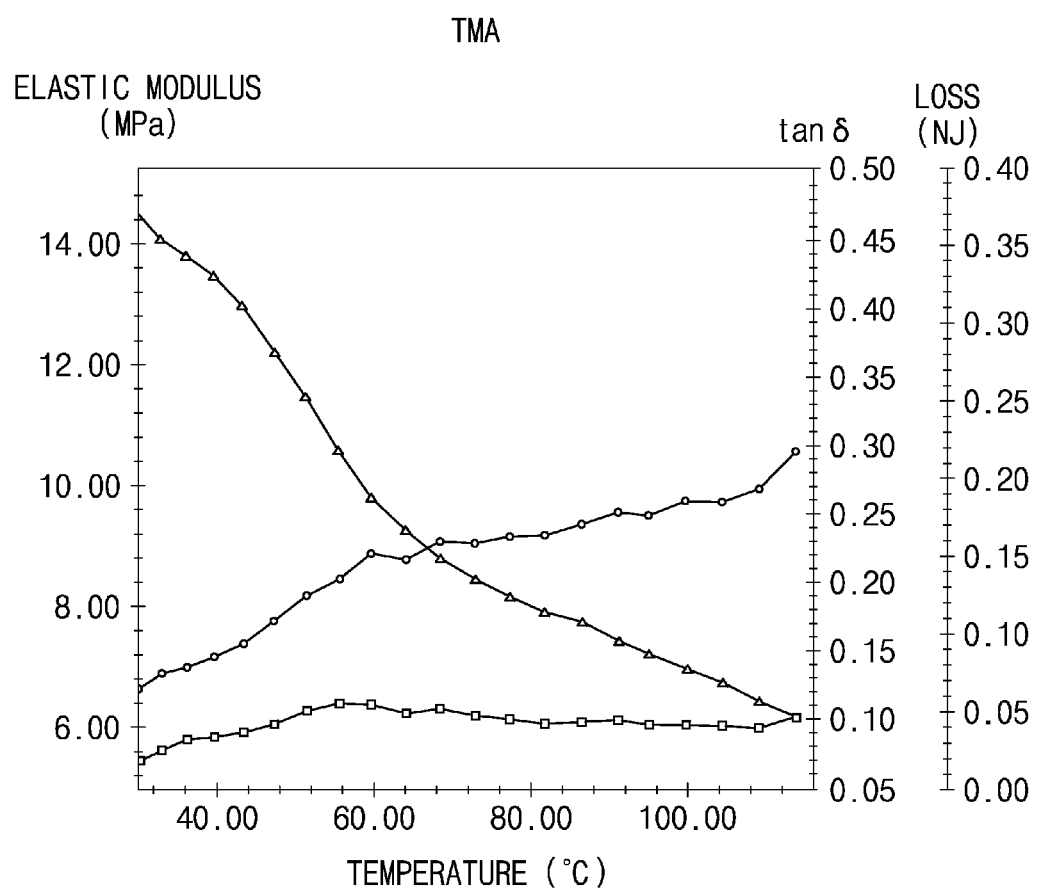
FIG. 5 is a graph of a result of dynamic viscoelasticity measurement (DMA) of a conventional flexible polyurethane tube.

Chuck-to-chuck distance: 15 mm
Measurement mode: tensile mode
Heating rate: 5° C./min
Load mode: cyclic load of sine wave
Amplitude: 5 g
Frequency: 60 sec
Offset value: −2 g The results of analysis of the measured data by the viscoelastic analysis software are shown in FIGS. 4 and 5. FIG. 4 is a graph showing dynamic viscoelasticity measurement (DMA) results of a polyurethane tube according to an embodiment of the present invention, and shows changes in storage elastic modulus, loss energy, and a tan δ value of the product of the present invention.

FIG. 5 is a graph showing the dynamic viscoelasticity measurement (DMA) results of the comparative example. Based on the analysis results, the storage elastic modulus $E'_{30}$ at 30° C. and the storage elastic modulus $E'_{80}$ at 80° C. were obtained, and the absolute value of the difference obtained by subtracting $E'_{80}$ from $E'_{30}$ was calculated. The measurement specimens were cut at five points of one measurement sample sheet and subjected to the same measurement, and the average value was used for calculation according to the Equation (2) to obtain the difference in storage elastic modulus.

[Equation 2]

$$\text{Difference in storage elastic modulus} = \frac{|E'30 - E'80|}{E'30} \times 100 \quad (2)$$

The difference in storage elastic modulus calculated is shown in Table 2.

The tubes of Examples 1 and 2 having a difference in storage elastic modulus of 15% or less maintained the bending repulsive stress at a low level, and the creep resistance was improved four-fold or more. On the other hand, the tubes of Comparative Examples 1 and 2 are not preferable despite a small bending repulsive stress thereof because the difference in storage elastic modulus is 20% or more, and the creep resistance property is poor.

Evaluation of Abrasion Resistance

Molding of Tube

As the second embodiment of the present invention, the tube of the present invention with improved abrasion resistance was prepared as Example 3 by the following method. A tube was molded in the same manner as above except that the product B-MS20 manufactured by Dainichiseika Color & Chemicals Mfg. Co., Ltd. was added to the dried polyurethane used in the molding of Examples 1 and 2, and the die temperature was lowered by 10° C.

Evaluation of Tube

<Surface Roughness>

The surface roughness of the tube was measured using a stylus surface roughness tester (Surf Test SJ-400 manufactured by Mitutoyo Corporation).

<Abrasion Resistance Test>

Figure 6:
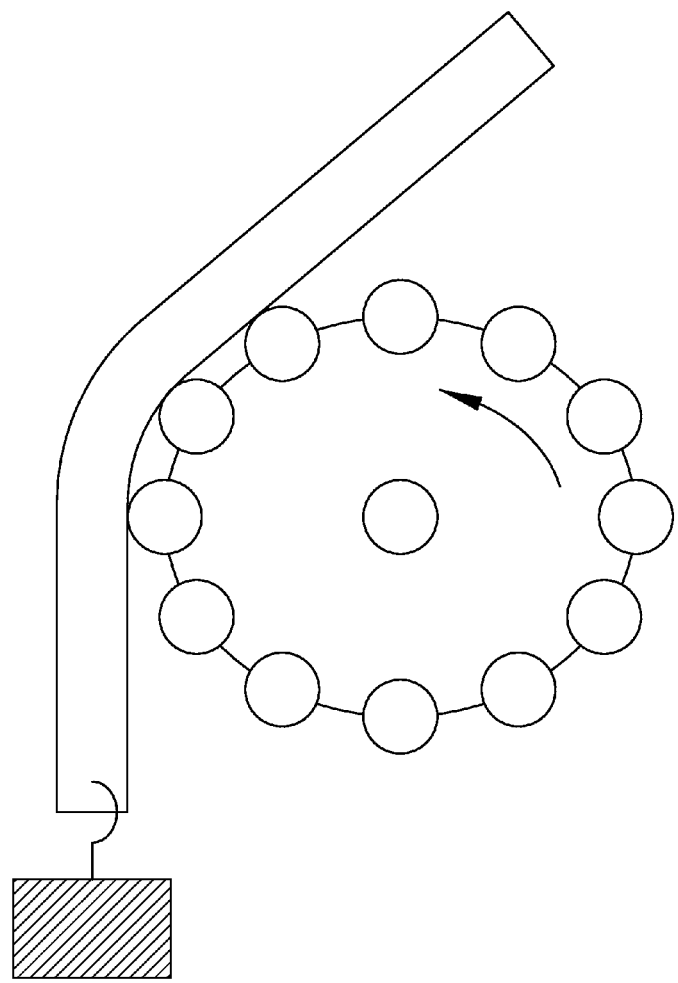
FIG. 6 is a view for explaining a test method of an abrasion resistance test.

FIG. 6 is a view for explaining a test method of the abrasion resistance test. As shown in FIG. 6, a weight is attached to one end of the sample tube, and the other end is fixed so that the weight hangs down. A rotating body to which 12 mating members are fixed is brought into contact with and rubbed against the hanging sample tube, and the amount of abrasion was measured. The test was performed on the sample tube with a sample tube length of 700 mm with a rotation speed of the rotating body of 100 rpm, using a weight of 456 g and nylon as the mating members.

The evaluation results of the tubes are shown in Table 3.

TABLE 3

|  | Example 3 | Comparative Example 2 | Comparative Example 3 |
|---|---|---|---|
| Bending repulsive stress 100 mm (N/mm²) | 0.022 | 0.022 | 0.036 |
| Surface roughness (μm) | 1.05 | 0.38 | 1.01 |
| Amount of abrasion (g) | 0.15 | 0.4 | 0.26 |

It was confirmed that, although the flexible (low hardness) tube is susceptible to abrasion, the tube of the present invention has a surface roughness of 0.8 μm or more, and the tube with low frictional properties further exhibits a small amount of abrasion compared with the conventional low-friction urethane tube due to a small bending repulsive stress thereof.

As described above, the polyurethane tube of the second embodiment of the present invention has excellent abrasion resistance, and thus, even when piping is provided, for example, to a cableveyor moving on a stage of a semiconductor manufacturing apparatus, resistance to abrasion due to friction with the cableveyor material, other cables and the like is increased.

As described above, according to the present invention, a polyurethane tube having a small bending repulsive stress and excellent inner-pressure creep resistant characteristics is obtained The polyurethane tube of the present invention can be used not only as a tube for flowing a fluid such as a gas or a liquid or a pneumatic tube for a machine or an apparatus, but also in an electronic device such as a computer, and is also applicable to a control circuit of a machine in which control devices need to be mounted in a narrow space such as automobiles and airplanes.

The invention claimed is:

1. A polyurethane tube comprising a thermoplastic polyurethane comprising (i) a soft segment and (ii) a hard segment, wherein the polyurethane tube has a bending repulsive stress of 0.035 N/mm$^2$ or less, and wherein the polyurethane tube is formed so that a difference between a storage elastic modulus $E'_{30}$ at 30° C. and a storage elastic modulus $E'_{80}$ at 80° C. is 15% or less of $E'_{30}$.

2. The polyurethane tube according to claim 1, wherein the tube has a surface roughness Ra of 0.8 μm or more.

* * * * *